Figure 1:
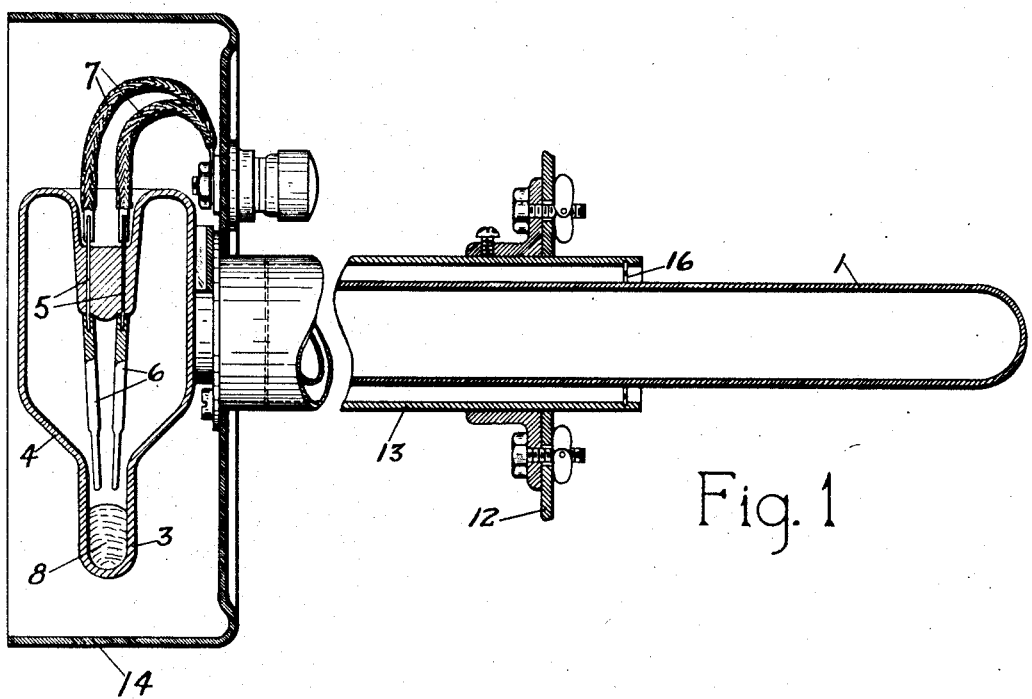

Nov. 6, 1928.

I. E. McCABE ET AL 1,691,016

TEMPERATURE CONTROL SWITCH

Filed April 10, 1926    2 Sheets-Sheet 1

INVENTORS:
IRA E. McCABE
RAYMOND W. ARMSTRONG
BY
ATTORNEY.

Patented Nov. 6, 1928.

1,691,016

UNITED STATES PATENT OFFICE.

IRA E. McCABE, OF CHICAGO, AND RAYMOND W. ARMSTRONG, OF WILMETTE, ILLINOIS; SAID ARMSTRONG ASSIGNOR TO THE ARCLESS CONTACT COMPANY, A CORPORATION OF ILLINOIS.

TEMPERATURE-CONTROL SWITCH.

Application filed April 10, 1926. Serial No. 101,040.

The present invention relates particularly to thermally controlled safety switches that close a circuit when the temperature of the governing medium rises, and open the circuit again when the temperature of such medium falls, although the device may be used for other purposes, if desired. Devices of this general type are used largely in connection with the flues of oil burning heating systems. In all of the prior devices of this kind, of which we are aware, there are several serious objections which it is the object of the present invention to overcome.

In the prior devices, in general use, the thermal element is such that no matter what the maximum temperature is while the switch is closed, it will again open when the temperature has dropped an invariable number of degrees. The result is that if the drop in temperature necessary to cause the switch to open at comparatively low temperatures is the proper one for low temperatures, its value will be too small at high temperatures. In other words, if a drop of seventy degrees from a comparatively low temperature will cause the switch to open, the same lowering of temperature from a much higher point will also cause the switch to open; but, the fluctuations of the flame in the combustion chamber, at the extremely high temperatures may be more than seventy degrees and will thus cause the switch to open when it should remain closed. The object of the present invention, viewed in one of its aspects, is to produce a simple and novel thermally controlled switch that will open upon a fall of temperature from a high point which increases progressively as the value of the high point increases; whereby it will require a greater drop in temperature from an initial high temperature, than from an initial lower temperature, to open the switch.

A further objection to the devices now generally in use is that the formation of scale on the thermal element causes a change in the characteristics of the switch. The present invention, viewed in one of its aspects, has for its object to produce a thermal element that indefinitely retains its capacity to operate the switch in precisely the same way as determined by the initial adjustment.

A further object of the present invention is to produce a switch of the character specified that may quickly and easily be adjusted to vary the temperature range that will cause the switch to operate.

A further object of the present invention is to produce a simple and novel thermally controlled switch that will open, if current is flowing through the same, in the event that the thermal element is broken.

Figure 2:
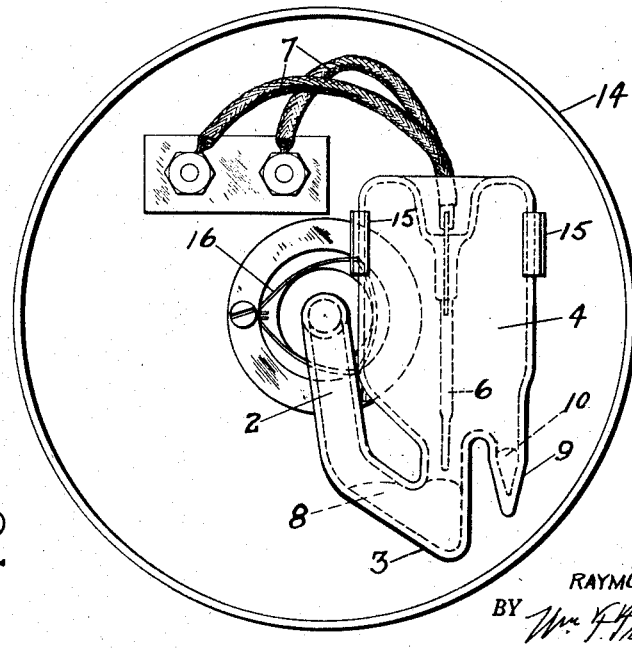

The various features of novelty whereby the present invention is characterized will hereinafter be pointed out with particularity in the claims; but, for a full understanding of the invention and of its objects and advantages, reference may be had to the following detailed description taken in connection with the accompanying drawings, wherein:

Figure 1 is a longitudinal section through a switch embodying the present invention, together with a fragment of a flue to which the switch is attached; Fig. 2 is an end view of the switch, looking at the left hand end of Fig. 1; and Figs. 3 and 4 are end views of the switch device, detached from its supports showing, respectively, closed and open positions.

Referring to the drawings, 1 represents a long glass tube or stem closed at one end and terminating at the other end in a tubular member 2 of small diameter. The member 2 is bent downwardly, assuming the stem to be horizontal, and then laterally at an acute angle to the vertical and again upwardly to form a V-shaped elbow 3. The vertical arm of the elbow terminates in a bulb or chamber 4 of considerable capacity. The members 1, 2, 3 and 4 may all conveniently be of glass formed into one integral structure. Entering the top of the bulb or chamber are leading-in wires 5, sealed in the glass; these leading-in wires being connected to the upper ends of a pair of long terminals or contact pieces 6 of iron or other suitable material. The members 6 are spaced apart from each other and they extend down into the upper end of the vertical arm of the elbow 3. The leading-in wires are connected to external conductors 7. Within the elbow is a small body of mercury 8 sufficient to form a seal, when the pressure on opposite sides thereof is the same, between the two arms of the elbow. The parts are so proportioned that when the mercury is in a position of rest, such as shown in Fig. 2, the pressure in the stem and the chamber 4 being equal, there is a gap between the lower ends of the contact pieces and the top of the mercury; this being the open position of the switch. If the pressure in the stem rises, assuming the device as a whole to be filled with a suitable gaseous medium, the mercury will be caused to flow in a direction away from the stem and toward the bulb or chamber, rising in the vertical arm of the elbow, and engaging with the contacts 6, thus completing the circuit of which the conductors 7 form a part.

Figure 3:
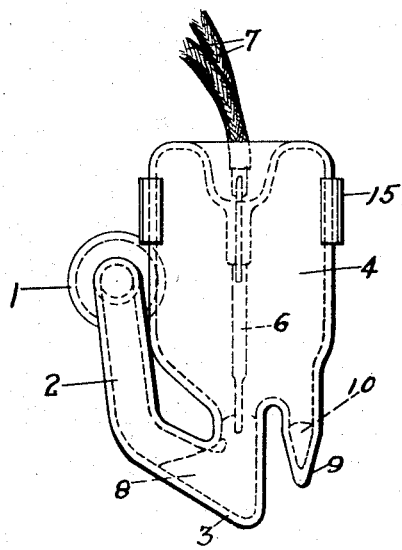
Figure 4:
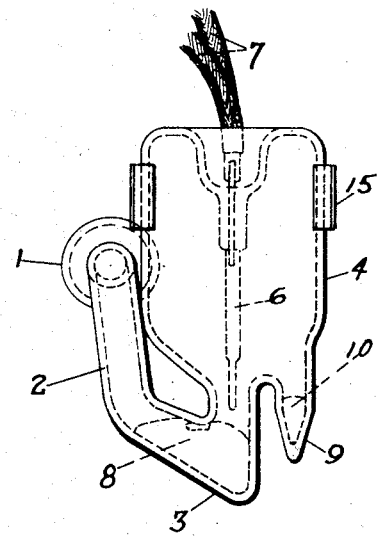

Assuming the conditions to be initially as illustrated in Figs. 1, 2 and 4, and that the stem is heated, without corresponding heating of the bulb or chamber 4, it will be seen that the gaseous medium will expand and shift the mercury as heretofore explained, to close the circuit, as indicated in Fig. 3. As the temperature rises still further, the gaseous medium in the stem and the adjacent portion of the conduit 2 begins to bubble up through the mercury and enters the bulb or chamber until a condition of equilibrium is obtained. It will be seen that after the mercury has been shifted into the circuit closing position, it will remain there, its position being unaffected by further rise in temperature, because the pressure on opposite sides of the mercury becomes sufficiently equalized through a transfer of gas.

When the temperature of the stem decreases, the pressure in the bulb will gradually force the mercury back from the circuit-closing position shown in Fig. 3, to the circuit-opening position of Fig. 4. If there was no transfer of gas from the stem to the bulb at the time or after the circuit was closed, the circuit will again be opened upon a predetermined minimum drop in temperature of the gas in the stem. However, when there is such a transfer of gas, the increase in the mass of the gas in the bulb is in a decreasing ratio to the rise in the temperature, and therefore the pressure, in the stem. Therefore, when the temperature in the stem drops, after such a transfer of gas from the stem to the bulb, then, because of the high temperatures that have been reached, contraction in volume of the gas in the stem and the expansion in volume of the gas in the bulb will be slower at the start and therefore the mercury will be pushed back more slowly than when the drop is from a lower temperature; the result being that the mercury will not be forced back into a circuit-opening position, at high temperatures until there has been a greater drop in temperature than the normal drop required to open the circuit under a condition involving no previous transfer of gas. Furthermore, the higher the temperature while the circuit is closed, the greater must be the fall before the circuit will again be opened. In other words, the drop in temperature necessary to open the circuit increases progressively with the maximum temperature reached before the lowering of the temperature begins. If there has been a transfer of gas from the stem to the bulb, and the temperature of the stem drops low enough, the mercury will be pushed back far enough, after the circuit has been opened, by the expanding gas in the bulb, to permit a re-transfer of gas from the bulb to the stem, the mercury being brought to such a position that the gas may bubble up through or past the same into the conduit leading to the stem, as shown in Fig. 4.

The stem 1, being of glass, does not accumulate scale as does a metal thermal element, and therefore the characteristics of the switch do not change with use, whereas the accumulation of scale on metal thermal elements seriously affects the operation of switches with which such elements are associated.

In the event that the stem should break it is desirable that the circuit should be broken. Provision to accomplish this end is made by so proportioning the contact pieces, the size of the chamber being taken into consideration, that the normal current flowing through the switch while it is closed will meet the contact pieces sufficiently to expand the gas in the chamber and create sufficient pressure to force the mercury down and break the circuit. This pressure need not be great, because if the stem is broken, no pressure can be built up in the latter and only a slight increase in the pressure in the chamber is required to insure that the mercury will be brought into a circuit-interrupting position.

It is very desirable to make switches of this kind adjustable. To this end the bulb or chamber is provided with a small well 9 in the bottom of the stem and adjacent to the upper end of the vertical arm of the elbow. In this well is a small quantity of mercury 10 that normally serves no useful function. If it be desired to change the characteristics of the switch by making the body of mercury 8 larger, the switch may be tilted so as to cause a part of the mercury 10 to flow into the elbow. On the other hand, if it is desired to decrease the body 8 of mercury, the switch may be tilted into a position that will permit some of this mercury to flow into the well.

The present invention is not concerned with means for mounting the switch in the place where it is to be used; but in the drawings there is illustrated a form of mounting adapted for oil burning furnaces. Thus, in Fig. 1, 12 represents the wall of a flue of an oil burning furnace. Extending through and fixed to this wall is a tube 13 on the outer end of which is fixed a casing 14. The stem of the switch device is introduced into the outer end of the tube 13 and is pushed inwardly until the bulb or chamber 4 lies in the casing. The device may be held in place by clips 15 that secure the bulb to the casing, the stem being centered in the tube 13 by yieldable supports 16 surrounding the same within the tube 13.

While we have illustrated and described with particularity only a single preferred form of our invention, we do not desire to be limited to the exact structural details thus illustrated and described; but intend to cover all forms and arrangements which come within the definitions of the invention constituting the appended claims.

We claim:

1. A switch device comprising a sealed glass receptacle containing a gas; said receptacle consisting of a long horizontal hollow stem terminating in a conduit bent downwardly and then upwardly to form an elbow, and a bulb beyond the elbow; a quantity of mercury in said elbow sufficient to form a seal when it is at its natural level; and a contact means in said bulb located so as to be out of engagement with the mercury when the latter is at the aforesaid level; there being a small well in the bottom of said bulb, in position to permit a ready transfer of mercury between the same and the elbow upon tilting the device.

2. In a switch device, a sealed glass receptacle containing a gas; said receptacle consisting of a long horizontal hollow stem, a bulb located adjacent to one end of the stem, and a conduit connecting the latter end of the stem and having therein a downwardly-projecting elbow, said bulb having therein a small well.

3. A switch device comprising a sealed receptacle composed of a hollow glass stem, a bulb and a conduit connecting the stems and the bulb and having a downwardly-projecting elbow therein; contact means in said bulb; a quantity of mercury in said elbow sufficient to form a seal between the stem and the bulb when the mercury is at its natural level and adapted to be raised into engagement with said contact means by gas pressure in the stem; the parts being so proportioned that normal current passing through said contact means will heat the latter sufficiently to expand the gas in the bulb and force the mercury away from the contact means in the event that the stem is broken while the mercury is engaged with said contact means.

In testimony whereof, we sign this specification.

IRA E. McCABE.
RAYMOND W. ARMSTRONG.